(12) United States Patent
Hale et al.

(10) Patent No.: US 8,036,931 B2
(45) Date of Patent: Oct. 11, 2011

(54) PROCESS AND HEURISTIC STATISTIC FOR PROSPECT SELECTION THROUGH DATA MINING

(75) Inventors: Curtis Richard Hale, Dunwoody, GA (US); John Baxter Rollins, Southlake, TX (US)

(73) Assignee: International Business Machines Corporation, Armonk, NY (US)

( * ) Notice: Subject to any disclaimer, the term of this patent is extended or adjusted under 35 U.S.C. 154(b) by 2380 days.

(21) Appl. No.: 10/742,099

(22) Filed: Dec. 19, 2003

(65) Prior Publication Data

US 2005/0149466 A1 Jul. 7, 2005

(51) Int. Cl.
G06Q 30/00 (2006.01)
(52) U.S. Cl. .................. 705/14.1; 705/14.43; 705/14.49
(58) Field of Classification Search ....................... 705/14
See application file for complete search history.

(56) References Cited

U.S. PATENT DOCUMENTS

| | | | |
|---|---|---|---|
| 5,687,322 A | 11/1997 | Deaton et al. | |
| 5,774,868 A | 6/1998 | Cragun et al. | |
| 5,848,396 A | 12/1998 | Gerace | |
| 5,937,392 A | 8/1999 | Alberts | |
| 5,974,393 A | 10/1999 | McCullough et al. | |
| 5,974,396 A | 10/1999 | Anderson et al. | |
| 6,012,051 A | 1/2000 | Sammon et al. | |
| 6,061,658 A | 5/2000 | Chou et al. | |
| 6,088,722 A | 7/2000 | Herz et al. | |
| 6,236,985 B1 | 5/2001 | Aggarwal et al. | |
| 6,298,348 B1 * | 10/2001 | Eldering | 705/36 R |
| 6,496,814 B1 | 12/2002 | Busche | |
| 6,567,786 B1 * | 5/2003 | Bibelnieks et al. | 705/14 |
| 6,571,216 B1 | 5/2003 | Garg et al. | |
| 6,578,011 B1 | 6/2003 | Forward | |
| 6,853,982 B2 | 2/2005 | Smith et al. | |
| 7,113,917 B2 | 9/2006 | Jacobi et al. | |
| 7,177,851 B2 | 2/2007 | Afeyan et al. | |
| 7,200,607 B2 * | 4/2007 | Downs | 707/102 |
| 2002/0016935 A1 | 2/2002 | Bergsten et al. | |
| 2002/0042739 A1 | 4/2002 | Srinivasan et al. | |
| 2002/0169764 A1 | 11/2002 | Kincaid et al. | |
| 2003/0061202 A1 | 3/2003 | Coleman | |
| 2003/0172374 A1 | 9/2003 | Vinson et al. | |
| 2003/0212619 A1 | 11/2003 | Jain et al. | |

OTHER PUBLICATIONS

M. Setnes et al., "Fuzzy Modeling of Client Preference from Large Data Sets: An Application to Target Selection in Direct Marketing," IEEE Transaction on Fuzzy Systems, Feb. 2001, 11 pages, vol. 9, No. 1.

(Continued)

*Primary Examiner* — Arthur Duran
*Assistant Examiner* — Alvin L Brown
(74) *Attorney, Agent, or Firm* — DeLizio Gilliam, PLLC

(57) ABSTRACT

An initial set of prospects in a customer database is identified, by data mining, as initially identified prospects based on predetermined selection criteria. The number of initially identified prospects is compared to a target number of prospects. When the number of initially identified prospects matches the target number of prospects, the initially identified prospects are utilized as the final selection of prospects. When the number of initially identified prospects mismatches the target number of prospects, the final selection of prospects is determined by performing a culling process or an augmenting process to reduce or increase, respectively, the initial set of prospects using a heuristic measure H, until the number of prospects in the initial set of prospects matches the target number of prospects.

18 Claims, 3 Drawing Sheets

OTHER PUBLICATIONS

M. Viswanathan et al., "Understanding How Product Attributes Influence Product Categorization: Development and Validation of Fuzzy Set-Based Measures of Gradedness in Product Categories," Journal of Marketing Research, Feb. 1999, pp. 75-94, vol. XXXVI.

"New Product Development", *Wikipedia* http://en.wikipedia.org/wiki/New_product_development (Date obtained Nov. 1, 2007), pp. 4-7.

Cox, Earl, "Fuzzy Logic and The Measures of Certainty in eCommerce Expert Systems", *PC AI* vol. 15, Issue 3 (May 2001), pp. 16-22.

Grasso, Jonathan et al., "Heuristic Rules", *Social Psychology in Advertising* http:72.14.253.104/search?q=cache:aAvo0WzTk-MJ:www.cortland.edu/psych/ads/heur.html (Date Obtained Nov. 6, 2007) Google's cache of www.cortland.edu/psych/ads/heur.html as retrieved on Oct. 9, 2007. 1999.

Koen, Peter A. et al., "Fuzzy Front End", *The PDMA ToolBook for New Product Development* Apr. 20, 2002, pp. 5-35.

"US Appl. No. 10/144,125 Final Office Action", Oct. 16, 2009, 12 pages.

IBM Technical Disclosure Bulletin, vol. 40, No. 2, Feb. 1997—Intelligent Miner; R. Agrawal, et al.

* cited by examiner

Record X　　　Cluster 1　　　Cluster 2

Cluster 1　　Record X　　　Cluster 2

PROCESS AND HEURISTIC STATISTIC FOR PROSPECT SELECTION THROUGH DATA MINING

CROSS REFERENCE TO RELATED APPLICATION

This application is related to co-pending U.S. patent application Ser. No. 10/144,125 titled "Targeting Customers," filed May 10, 2002 by different inventors, which is assigned to the same assignee as the present application.

BACKGROUND OF THE INVENTION

1. Field of the Invention

The present invention is directed to a method, system, and article of manufacture for prospect selection using a heuristic statistic when culling or augmenting a prospect list for a given promotion.

2. Description of the Prior Art

Consumer Packaged Goods (CPG) manufacturers pay retail firms to promote their products. Typically, a CPG manufacturer specifies a number of prospects fitting specific criteria to target in a particular promotion to be conducted by a retailer. Using the CPG manufacturer's selection criteria, the retailer queries its customer database (e.g., loyalty card holders) to identify prospective targets. The CPG manufacturer pays the retailer on a per-prospect basis to conduct the promotion. Promotional revenue from sales by the retailer varies according to the number of prospects that the CPG manufacturer targets that the retailer can supply. The process of compiling a list of prospective customers to target in a promotion is known as prospecting.

The problem that the retailer faces in prospecting is that, in general, applying the CPG manufacturer's selection criteria to the retailer's customer database will result in either too many or too few prospects being identified for a given promotion. The retailer is then faced with the problem of either culling prospects in the case of too many prospects, or identifying additional prospects to supplement the initially selected prospect list in the case of too few prospects, in order to meet the desired number of prospects for the promotion. The process of culling or supplementing is manual, laborious and time-consuming, and may not produce the highest-potential list of prospects in terms of expected responsiveness to the promotion.

According to one prior-art solution, after compiling the initial list of prospects through querying its customer database using selection criteria provided by the CPG manufacturer, the retailer determines whether the initial selection has yielded too many or too few prospects for the respective promotion. If too many have been selected, then the list is culled by some ad hoc method, e.g., eliminating those whose customer loyalty card ends in, for instance, 5 or 9. If too few have been selected, then the retailer meets with the CPG manufacturer to try to negotiate a relaxation in the selection criteria, and then determines whether the relaxed criteria generate enough additional prospects to meet the specified number.

If the prospect list must be culled in order to reduce the number of prospects, typical ad hoc methods do not ensure that the highest-potential prospects are retained. As a result, overall response to the promotion may be substantially less than optimal.

If the prospect list must be augmented, and if relaxed selection criteria do not generate a sufficient number of additional prospects, or if the CPG manufacturer decides against relaxing the criteria, then the size of the promotion must be reduced. As a result, the retailer realizes less promotional revenue and reduced sales boost from the promotion. Furthermore, the CPG manufacturer's selection criteria may be based on "best guess" and hence may not identify the highest-potential prospects, again resulting in a less than optimal to the promotion.

It is therefore desirable to provide an improved method, system, and article of manufacture for prospect selection, using a heuristic statistic, when culling or augmenting a prospect list for a given promotion.

BRIEF SUMMARY OF THE INVENTION

In accordance with the present invention, there is provided a method, system and computer program product for identifying a final selection of prospects from a customer database containing a plurality of prospects for a product promotion. An initial set of prospects is identified as initially identified prospects by data mining in a customer database, based on predetermined selection criteria. The final selection of prospects is determined by performing a culling process or an augmenting process to reduce or increase, respectively, the initial set of prospects using a heuristic measure H, until the number of prospects in the initial set of prospects matches the predetermined target number of prospects.

In accordance with another aspect of the present invention, there is provided a method, system and computer program product for identifying a final selection of prospects from a customer database containing a plurality of prospects for a product promotion. An initial set of prospects is identified as initially identified prospects by data mining in a customer database, based on predetermined selection criteria. The number of the initially identified prospects is compared to a target number of prospects and, when the number of initially identified prospects matches the target number of prospects, the initially identified prospects are utilized as the final selection of prospects. When, however, the number of initially identified prospects mismatches the target number of prospects, the final selection of prospects is determined by performing a culling process or an augmenting process to reduce or increase, respectively, the initial set of prospects using a heuristic measure H, until the number of prospects in the initial set of prospects matches the predetermined target number of prospects.

In accordance with yet another aspect of the present invention, the culling process includes ranking each prospect of the initial set by a heuristic measure H and selecting prospects from the initial set in order of H for the final selection of prospects until the target number is matched.

In accordance with still another aspect of the present invention, the augmenting process includes ranking each remaining customer of the database not selected for the initial set by a heuristic measure H and selecting prospects for addition to the initial set from the remaining customers in order of H for the final selection of prospects until the target number is matched.

One advantage obtained from the present invention is that it provides an easier to use method for selecting prospects than prior art ad hoc methods.

Another advantage obtained from the present invention is that it is a lower cost, less time-intensive method than prior art methods.

Yet another advantage obtained from the present invention is a reduction in the number of highly skilled analysts required compared to prior art methods and systems.

Other advantages of the subject method, system, and article of manufacture will become apparent to those skilled in the art upon a reading and understanding of this specification.

BRIEF DESCRIPTION OF THE DRAWINGS

The invention may take physical form in certain parts and steps and arrangements of parts and steps, the embodiments of which will be described in detail in this specification and illustrated in the accompanying drawings hereof and wherein.

DETAILED DESCRIPTION OF THE INVENTION

Figure 1:
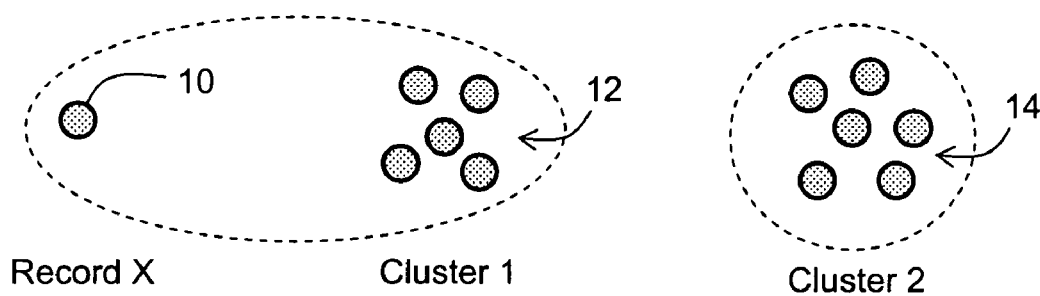
FIG. 1 is a graphical depiction of a first exemplary clustering scenario according to aspects of the present invention.

Reference will now be made in detail to an embodiment of the present invention, examples of which are illustrated in the accompanying drawings. The detailed description that follows is presented in terms of general procedures, steps and symbolic representations of operations of data bits within a computer memory, associated computer processors, networks, and network devices. These procedure descriptions and representations are the means used by those skilled in the data processing art to convey the substance of their work to others skilled in the art. A procedure is here, and generally, conceived to be a self-consistent sequence of steps or actions leading to a desired result. Thus, the term "procedure" is generally used to refer to a series of operations performed by a processor, be it a central processing unit of a computer, or a processing unit of a network device, and as such, encompasses such terms of art as "objects," "functions," "subroutines" and "programs."

The procedures presented herein are not inherently related to any particular computer or other apparatus. In particular, various general-purpose machines may be used with programs in accordance with the teachings herein, or it may prove more convenient to construct more specialized apparatus to perform the required method steps.

However, one of ordinary skill in the art will recognize that a variety of platforms and languages exist for creating software for performing the procedures outlined herein. One of ordinary skill in the art also recognizes that the choice of the exact platform and language is often dictated by the specifics of the actual system constructed, such that what may work for one type of general purpose computer may not be efficient on another type of general purpose computer.

One of ordinary skill in the art to which this invention belongs will have a reasonable understanding of data mining techniques. It being recognized that such practitioners do not require specific details of the software, but rather find data structure descriptions and process descriptions more desirable (due to the variety of suitable hardware and software platforms), such specifics are not discussed to avoid obscuring the invention.

According to one embodiment of the present invention, selected results from a data mining technique known as clustering are used to construct a "best fit" heuristic statistic, H, that takes into account the quality of fit of each database record to its assigned cluster, the confidence of that fit, and the quality of fit to the next best cluster. The clustering results are generated by an available data mining tool such as IBM's DB2 Intelligent Miner for Data or DB2 Modeling extender. The data mining tool outputs calculated measurements including an assigned cluster identifier (ID), a next-best cluster ID, and a confidence value of assigned fit for each record.

According to a preferred embodiment, the heuristic statistic is calculated for each record as follows:

$$H = Confidence \times Score1 \div Score2 \text{ where:}$$

Confidence is a measure of certainty that the record has been assigned to the best cluster, $0 \leq Confidence \leq 1$, where 0 is the lowest certainty, Score1 is a measure of how well the record fits in its assigned cluster, $0 \leq Score1 \leq 1$, with 0 representing the poorest fit, and Score2 is a measure of how well the record fits in the next-best cluster, $0 \leq Score2 \leq 1$, with 0 representing the poorest fit.

H has the desirable property of having a higher value (better fit) when the record more clearly belongs to the assigned cluster (higher Confidence), the record is closer to the center of its assigned cluster (higher Score1), and the record is farther away from the center of the next-best cluster (lower Score2). H has a lower bound of 0 and no upper bound. Alternate definitions of H, Confidence, Score1, and Score2 having properties similar to the above-described property, and similar effects as described herein may, of course, be used as desired, and are intended to fall within the scope of the present invention.

Figure 2:
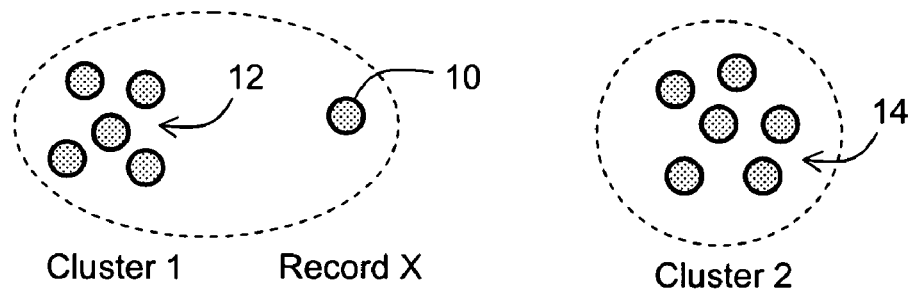
FIG. 2 is a graphical depiction of a second exemplary clustering scenario according to aspects of the present invention.

The rationale for the heuristic static, H, is illustrated graphically in FIGS. 1-2. With reference to FIG. 1, a first scenario is depicted wherein a prospect database record 10, labeled record X, is assigned with high confidence to a first cluster 12, labeled cluster 1. Record X is assigned with high confidence to cluster 1 because there is no competing cluster near to record X; the second cluster 14, labeled cluster 2, is too distant from record X to be considered a competing cluster. Even though record X is not near to the center of the first cluster 12 (low Score1), it is assigned to the first cluster because there are no competing clusters.

With reference now to FIG. 2, where like numerals represent like entities, a second scenario is depicted wherein the prospect database record 10 (record X) is assigned with low confidence to the first cluster 12 (cluster 1) because there is a competing second cluster 14 cluster 2). The second cluster 14 is more distant from record X than is the first cluster 12, but it is close enough to be considered a competing cluster. In this instance, the prospect record X has a higher Score1 than the first-presented scenario, owing to being nearer to the center of cluster 1, its assigned cluster.

Figure 3:
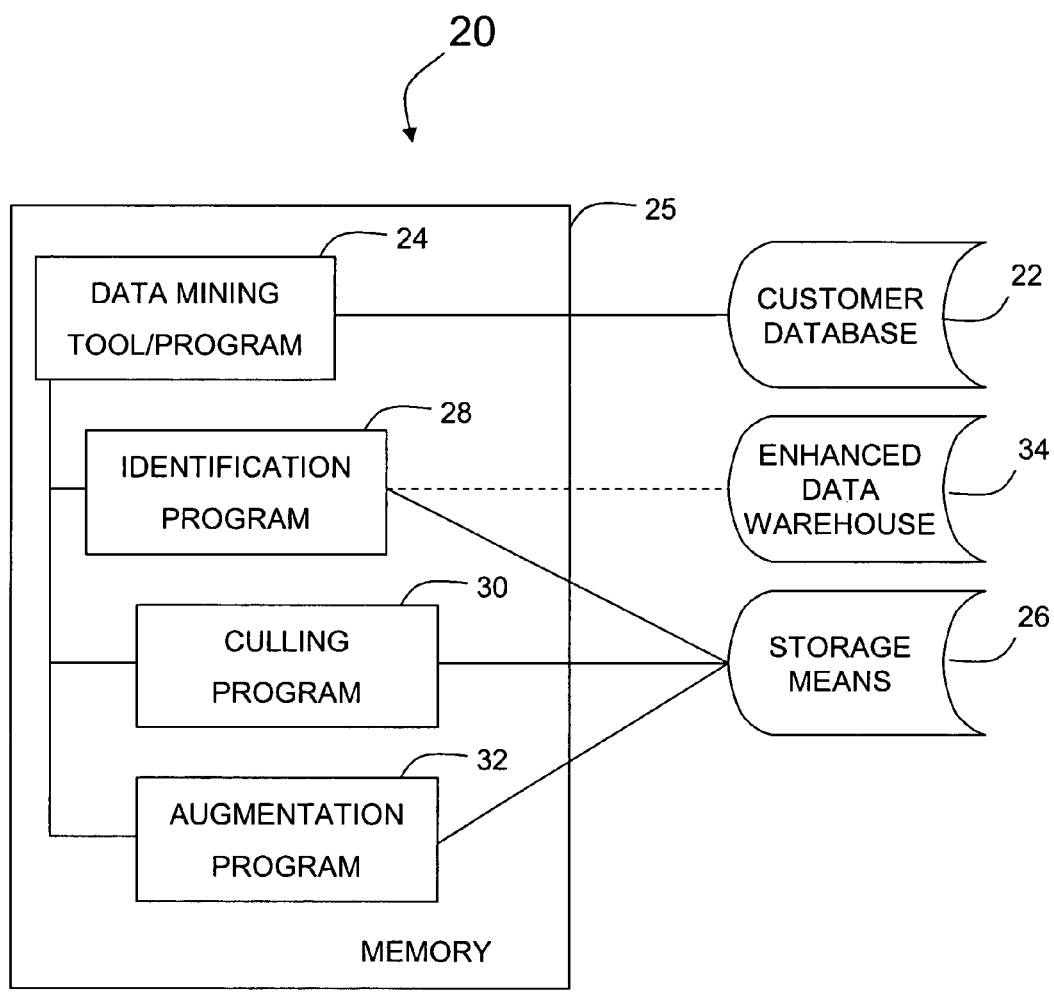
FIG. 3 is a schematic representation of a system suitable for practicing aspects of the present invention.

In describing an embodiment of the present invention, with reference to FIG. 3, it is assumed that a retailer has access via a system 20 to a customer database 22 with such attributes such as, for example, customer demographics and purchases by category and product class. It is further assumed that a data mining tool 24 such as, for instance, IBM's DB2 Intelligent Miner for Data or DB2 Modeling extender is available, shown running in a memory 25 on the system 20. It is further assumed that the data mining tool 24 is capable of outputting, to a storage means 26 and/or to the memory 25, calculated information including cluster ID, assigned cluster, next-best cluster, and confidence of assigned fit for each customer. The system will include a customer identification process 28, a culling process 30 and an augmentation process 32 which are described in further detail below. The system 20 may also optionally include an enhanced data warehouse 34, also described in further detail below.

Figure 4:
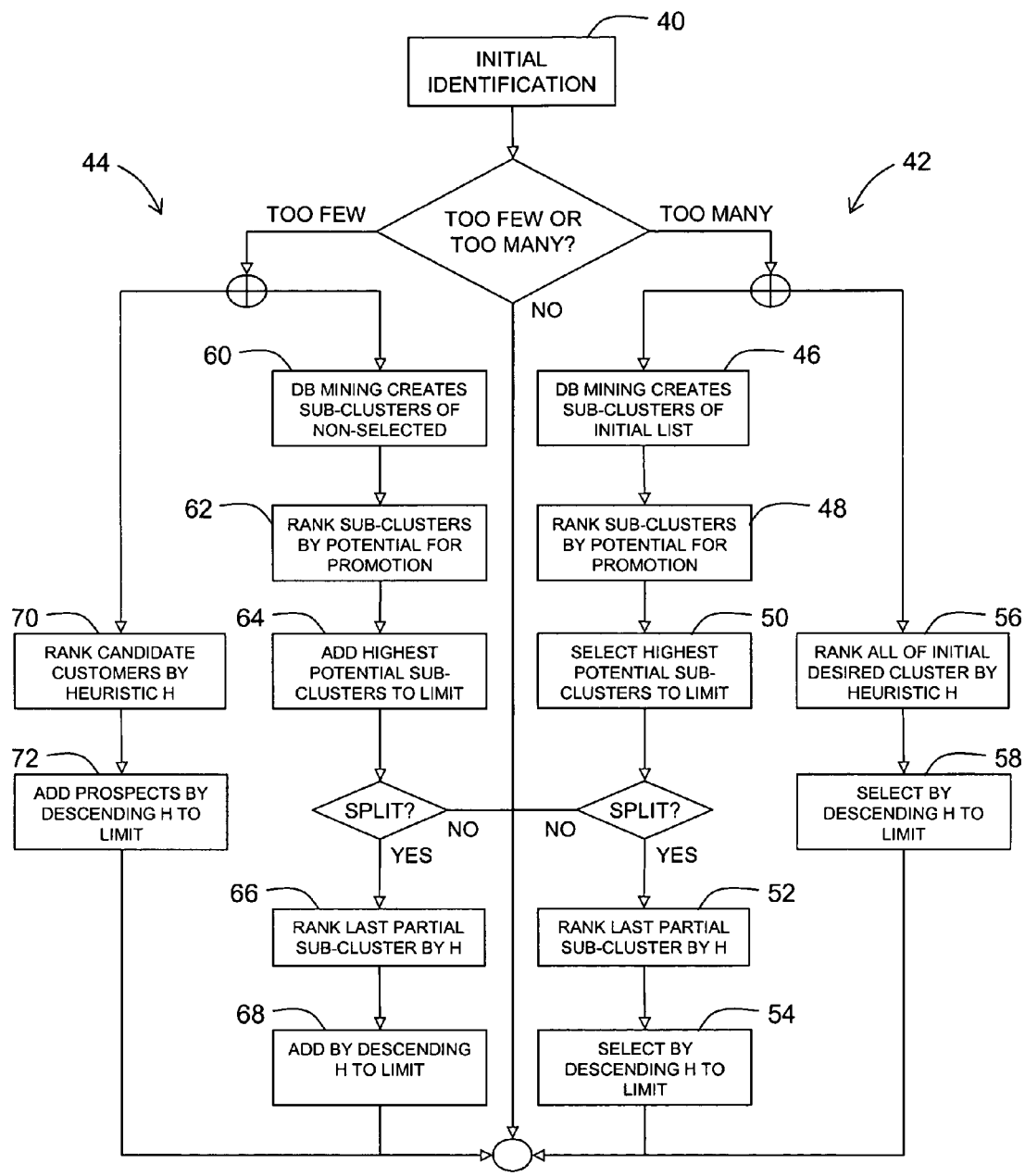
FIG. 4 is a flowchart of a method according to the present invention.

With reference now to FIG. 4, a first step 40, prior to any culling or augmentation processes 42,44, is the initial identification of prospects (40) using CPG selection criteria. Criteria (customer attributes) are provided by the CPG manufacturer to select a target group for a given promotion. A retailer handling the CPG promotion queries its customer database (e.g., loyalty card holders) to identify the initial group of prospects (desired cluster) for the promotion.

In general, the desired cluster will contain either too many or too few prospects being identified for a given promotion. This is because the number of prospects that the CPG manufacturer wants to target is based on an arbitrary number, e.g., 100,000, with an associated promotional budget, not on an understanding of the actual number of customers who have the specified attributes. The desired cluster is normally either decreased (too many prospects initially) or increased (too few prospects initially) to attain the number of prospects that the CPG manufacturer wants to target.

Following the initial identification of prospects (40), the prospect list undergoes a culling process (42) if too many are initially identified in the desired cluster. Using the data mining technique known as clustering, a model is created using the members of the desired cluster to produce one or more sub-clusters (46) that describe the different behavioral and characteristic profiles of the respective cluster member customers. Either of two approaches may be utilized for the culling process, depending on the preference or objectives of the CPG manufacturer.

In the first approach to culling, the sub-clusters are reviewed with the CPG manufacturer and ranked (48) according to their potential (expected responsiveness) for the given promotion, in terms of demographics and behavioral characteristics. Prospects are selected 50 from the highest-potential sub-clusters until the desired limit is approached (given that sub-clusters contain discrete numbers of customers). If the limit is reached midway in a sub-cluster, the members of that sub-cluster are ranked (52) by the heuristic statistic, H. From the ranked list of members of the sub-cluster in question, prospects are selected (54) in descending order of H until the prospect limit is reached.

In the second approach, all members of the desired cluster are ranked (56) using the heuristic statistic, H. Prospects from the ranked list are selected (58) until the desired limit is reached.

The prospect list now consists of a subset of the initial desired cluster. This subset can be expected to consist of a more desirable subset of the original desired cluster than would have resulted from culling by ad hoc means, resulting in higher overall responsiveness of the prospect group to the promotion.

If the initial prospect list contains too few prospects in the desired cluster, an augmentation process is undertaken. A clustering model is created using the members of the desired cluster. The customer information is optionally enriched with additional information from the customer database and/or from third-party data sources which can be particularly helpful in this case, by providing additional customer characteristics for clustering. The clustering model is applied to some or all of the customer database records that are not already included in the desired cluster to produce (60) one or more candidate sub-clusters that describe profiles of the respective sub-cluster member customers.

If only some of these records are chosen, then they may be selected randomly, or by other criteria, to ensure a representative sample. Application of the model to the chosen records (either some or all not already included in the desired cluster) generates the candidate sub-clusters. The model enables the identification of sub-clusters of prospects that are most similar to the desired cluster but did not meet the original selection criteria. As with the culling process, either of two approaches may be taken for augmenting the prospect list.

In the first augmentation approach, the candidate sub-clusters are reviewed with the CPG manufacturer and ranked (62) according to their potential (expected responsiveness) for the given promotion, in terms of demographics and behavioral characteristics. Prospects are selected (64) from the highest-potential sub-clusters and added to the initially selected desired cluster until the desired limit is approached. If the limit is reached midway in a sub-cluster, then the members of that sub-cluster, or any particular sub-cluster, are ranked (66) by the heuristic statistic, H. From the ranked list of members of the sub-cluster in question, prospects are selected (68) in descending order of H and added to the desired cluster until the prospect limit is reached. Further, the invention is not limited to selecting in descending order of H. Alternate formulations of H having the desired properties can be incorporated wherein selecting on an ascending order of H would be appropriate.

In the second augmentation approach, all of the additional candidate customers are ranked (70) using the heuristic statistic, H, without regard to the sub-clusters. Prospects are then selected (72) from the ranked list until the target number is reached.

The prospect list now consists of the desired cluster plus a subset of additional prospects. These additional prospects can be expected to exhibit better responsiveness to the promotion than a subset selected by ad hoc means, resulting in higher overall responsiveness of the prospect group to the promotion.

By discovering logical segments of additional customers, clustering provides a rationale for the CPG to expand the size of the promotion.

By discovering logical customer segments that can lead to higher overall potential responsiveness to a given promotion, clustering further provides a substantive rationale for the CPG manufacturer to expand the size of the promotion beyond the initially planned size. This can be done by including more prospects from the original desired cluster or expanding the prospect list beyond the original desired cluster through applying the clustering model to part or all of the remaining total customer database.

Although data mining techniques are sometimes used by retailers to select prospects for promotional campaigns, such analyses generally require highly skilled analysts to perform ad hoc studies on a per-campaign basis. This ad hoc approach tends to be expensive and, hence, may be suitable only for very large-scale promotions. Consequently, either hiring in-house experts or engaging outside consultants is often not cost-effective. As a result, the benefits of a data mining-based, ad hoc approach to prospect selection may not be attainable for many retailers. The present invention provides a lower-cost, more accessible, easier-to-use approach to prospect identification.

In optional embodiments, the above-described prospect identification process can form a foundation to evolve a retailer's customer database into an enhanced enterprise data warehouse (EDW), preferably on a distributed platform. The EDW is thereby designed to prepare, deliver, and update the customer database in accordance with this process, facilitating the identification process application to new promotions and reducing the execution time thereof. The prospect identification process may also be effectively implemented as an application accessed through a portal, facilitating its usage by category managers and analysts.

Other advanced technologies may also be implemented as part of the identification process as well. For example, Materialized Query Tables (MQTs) can form the basis for an advanced analytical platform including, e.g., data mining, OLAP, and query using DB2 Cube Views.

The invention has been described with reference to the preferred embodiments. Modifications and alterations will occur to others upon a reading and understanding of the specification. It is our intention to include all such modifications and alterations insofar as they come within the scope of the appended claims, or the equivalents thereof.

Having thus described our invention, we now claim:

1. A computer-implemented method comprising:
    generating, by a processor, an initial cluster of desired prospects from a plurality of prospects in a customer database to target in a marketing promotion based, at least in part, on
    criteria of the marketing promotion and attributes of the plurality of prospects;
    determining that the initial cluster does not satisfy a target number of prospects of the marketing promotion;
    creating a model based on the initial cluster;
    if the initial cluster comprises more prospects than the target number of prospects, creating a first plurality of sub-clusters from the initial cluster based, at least in part, on the model, ranking each of the first plurality of sub-clusters by potential for responsiveness to the marketing promotion;
    if the initial cluster comprises fewer prospects than the target number of prospects, creating a second plurality of sub-clusters with additional prospects from the customer database based, at least in part, on the model, ranking each of the second plurality of sub-clusters by potential for responsiveness to the marketing promotion;
    selecting each of the second plurality of sub-clusters in descending order to augment the initial cluster until an augmented initial cluster would meet the target number of prospects or a first of the second plurality of sub-clusters would cause the augmented initial cluster to exceed the target number of prospects;
    if the first of the second plurality of sub-clusters would cause the augmented initial cluster to exceed the target number of prospects, ranking those prospects that comprise the first of the second plurality of sub-clusters by a heuristic statistic corresponding thereto, selecting each prospect of the first of the second plurality of sub-clusters in descending order to augment the initial cluster until the augmented initial cluster meets the target number of prospects;
    selecting each of the first plurality of sub-clusters in descending order to cull the initial cluster until a culled initial cluster would meet the target number of prospects or a first of the first plurality of sub-clusters would cause the culled initial cluster to exceed the target number of prospects;
    if the first of the first plurality of sub-clusters would cause the culled initial cluster to exceed the target number of prospects, ranking those prospects that comprise the first of the first plurality of sub-clusters by a heuristic statistic corresponding thereto, selecting each prospect of the first of the first plurality of sub-clusters in descending order to cull the initial cluster until the culled initial cluster meets the target number of prospects; and
    generating a prospect list for the marketing promotion based on the culled initial cluster or the augmented cluster.

2. The method of claim 1, wherein said ranking each of the plurality of sub-clusters by potential for responsiveness to the marketing promotion is in terms of demographics and behavioral characteristics.

3. The method of claim 1 further comprising enriching customer information of the plurality of prospects with additional information from at least one of the customer database and a third-party data source.

4. The method of claim 1, wherein said creating the second plurality of sub-clusters with the additional prospects from the customer database based, at least in part, on the model comprises selecting all of the plurality of prospects from the customer database that do not comprise the initial cluster or selecting a subset of the plurality of prospects from the customer database that do not comprise the initial cluster.

5. The method of claim 1, further comprising calculating the heuristic value for each of the plurality of prospects, wherein the heuristic value represents a quality of fit with respect to an assigned cluster.

6. The method of claim 5, wherein said calculating the heuristic value for each of the plurality of prospects comprises determining a confidence, a first score, and a second score.

7. The method of claim 6, wherein the confidence represents a level of certainty that each of the plurality of prospects has been assigned to a best cluster.

8. The method of claim 6, wherein the first score represents a measure of how well each of the plurality of prospects fits in an assigned cluster.

9. The method of claim 6, wherein the second score represents a measure of how well each of the plurality of prospects fits in a next-best cluster.

10. The method of claim 6, wherein the heuristic value is calculated in accordance with confidence×first score÷second score.

11. A computer program product for identifying prospects for a marketing promotion based on clustering and heuristics, the computer program product comprising:
    a non-transitory computer usable medium having computer usable program code embodied therewith, the computer usable program code comprising:
    a non-transitory computer usable program code configured to, generate an initial cluster of desired prospects from a plurality of prospects in a customer database to target in a marketing promotion based, at least in part, on criteria of the marketing promotion and attributes of the plurality of prospects;
    determine that the initial cluster does not satisfy a target number of prospects of the marketing promotion;
    create a model based on the initial cluster;
    if the initial cluster comprises more prospects than the target number of prospects, create a first plurality of sub-clusters from the initial cluster based, at least in part, on the model, rank each of the first plurality of sub-clusters by potential for responsiveness to the marketing promotion;
    if the initial cluster comprises fewer prospects than the target number of prospects, create a second plurality of sub-clusters with additional prospects from the customer database based, at least in part, on the model, rank each of the second plurality of sub-clusters by potential for responsiveness to the marketing promotion;
    select each of the second plurality of sub-clusters in descending order to augment the initial cluster until an augmented initial cluster would meet the target number of prospects or a first of the second plurality of sub-clusters would cause the augmented initial cluster to exceed the target number of prospects;
    if the first of the second plurality of sub-clusters would cause the augmented initial cluster to exceed the target number of prospects, rank those prospects that comprise the first of the second plurality of sub-clusters by a heuristic statistic corresponding thereto, select each prospect of the first of the second plurality of sub-clusters in descending order to augment the initial cluster until the augmented initial cluster meets the target number of prospects;

select each of the first plurality of sub-clusters in descending order to cull the initial cluster until a culled initial cluster would meet the target number of prospects or a first of the first plurality of sub-clusters would cause the culled initial cluster to exceed the target number of prospects;

if the first of the first plurality of sub-clusters would cause the culled initial cluster to exceed the target number of prospects, rank those prospects that comprise the first of the first plurality of sub-clusters by a heuristic statistic corresponding thereto, select each prospect of the first of the first plurality of sub-clusters in descending order to cull the initial cluster until the culled initial cluster meets the target number of prospects; and generate a prospect list for the marketing promotion based on the culled initial cluster or the augmented cluster.

12. The computer program product of claim 11, wherein the computer usable program code is configured to rank each of the plurality of sub-clusters by potential for responsiveness to the marketing promotion in terms of demographics and behavioral characteristics.

13. The computer program product of claim 11 further comprising the computer usable program code being configured to enrich customer information of the plurality of prospects with additional information from at least one of the customer database and a third-party data source.

14. The computer program product of claim 11, wherein the computer usable program code being configured to create the second plurality of sub-clusters with the additional prospects from the customer database based, at least in part, on the model comprises the computer usable program code configured being configured to select all of the plurality of prospects from the customer database that do not comprise the initial cluster or to select a subset of the plurality of prospects from the customer database that do not comprise the initial cluster.

15. An apparatus comprising:
a processing units;
a network interface;
a data mining unit, the data mining unit operable to,
  generate an initial cluster of desired prospects from a plurality of prospects in a customer database to target in a marketing promotion based, at least in part, on criteria of the marketing promotion and attributes of the plurality of prospects;
an identification unit coupled with the data mining unit, the identification unit operable to,
  determine that the initial cluster does not satisfy a target number of prospects of the marketing promotion;
  create a model based on the initial cluster;
  if the initial cluster comprises more prospects than the target number of prospects,
    create a first plurality of sub-clusters from the initial cluster based, at least in part, on the model,
    rank each of the first plurality of sub-clusters by potential for responsiveness to the marketing promotion;
  if the initial cluster comprises fewer prospects than the target number of prospects,
    create a second plurality of sub-clusters with additional prospects from the customer database based, at least in part, on the model,
    rank each of the second plurality of sub-clusters by potential for responsiveness to the marketing promotion;
a culling unit coupled with the identification unit, the culling unit operable to,
  select each of the first plurality of sub-clusters in descending order to cull the initial cluster until a culled initial cluster would meet the target number of prospects or a first of the first plurality of sub-clusters would cause the culled initial cluster to exceed the target number of prospects;
  if the first of the first plurality of sub-clusters would cause the culled initial cluster to exceed the target number of prospects,
    rank those prospects that comprise the first of the first plurality of sub-clusters by a heuristic statistic corresponding thereto,
  select each prospect of the first of the first plurality of sub-clusters in descending order to cull the initial cluster until the culled initial cluster meets the target number of prospects;
  generate a prospect list based on the culled initial cluster; and
an augmentation unit coupled with the identification unit, the augmentation unit operable to,
  select each of the second plurality of sub-clusters in descending order to augment the initial cluster until an augmented initial cluster would meet the target number of prospects or a first of the second plurality of sub-clusters would cause the augmented initial cluster to exceed the target number of prospects;
  if the first of the second plurality of sub-clusters would cause the augmented initial cluster to exceed the target number of prospects,
    rank those prospects that comprise the first of the second plurality of sub-clusters by a heuristic statistic corresponding thereto,
  select each prospect of the first of the second plurality of sub-clusters in descending order to augment the initial cluster until the augmented initial cluster meets the target number of prospects;
  generate the prospect list based on the augmented initial cluster.

16. The apparatus of claim 15, wherein the identification unit being operable to rank each of the plurality of sub-clusters by potential for responsiveness to the marketing promotion is in terms of demographics and behavioral characteristics.

17. The apparatus of claim 15, wherein the augmentation unit is further operable to enrich customer information of the plurality of prospects with additional information from at least one of the customer database and a third-party data source.

18. The apparatus of claim 15 wherein the augmentation unit being operable to create the second plurality of sub-clusters with the additional prospects from the customer database based, at least in part, on the model comprises the augmentation unit being operable to select all of the plurality of prospects from the customer database that do not comprise the initial cluster or selecting a subset of the plurality of prospects from the customer database that do not comprise the initial cluster.

* * * * *